(12) United States Patent
Yamashita et al.

(10) Patent No.: US 8,680,396 B2
(45) Date of Patent: Mar. 25, 2014

(54) OIL-COOLED EQUIPMENT HARNESS

(75) Inventors: Nobuyuki Yamashita, Hitachi (JP); Masaaki Imahori, Hitachinaka (JP); Michiaki Shimizu, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 264 days.

(21) Appl. No.: 13/193,367

(22) Filed: Jul. 28, 2011

(65) Prior Publication Data
US 2012/0024599 A1    Feb. 2, 2012

(30) Foreign Application Priority Data

Jul. 29, 2010  (JP) ................................. 2010-170863

(51) Int. Cl.
*H02G 15/04*    (2006.01)
(52) U.S. Cl.
USPC ........................................................ 174/74 R
(58) Field of Classification Search
CPC ..................................................... H02G 15/04
USPC ............................................... 174/74 R, 360
See application file for complete search history.

(56) References Cited

U.S. PATENT DOCUMENTS

| | | | |
|---|---|---|---|
| 5,417,587 A * | 5/1995 | Katsuda et al. | ............... 439/559 |
| 2001/0027040 A1* | 10/2001 | Yoshioka et al. | ............... 439/98 |
| 2001/0029120 A1* | 10/2001 | Miyazaki et al. | ............... 439/98 |

FOREIGN PATENT DOCUMENTS

| | | | | |
|---|---|---|---|---|
| JP | 08264238 A | * | 10/1996 | ............ H01R 17/04 |
| JP | 2001-273946 A |   | 10/2001 | |
| JP | 2002-42917 A |   | 2/2002 | |
| JP | 2003-272729 A |   | 9/2003 | |
| JP | 2009-71980 A | * | 4/2009 | |

OTHER PUBLICATIONS

Kuboshima, Hidehiko, Abstract, Mar. 23, 1995, JP408264238A.*
Suzuki, S, Abstract, Apr. 2, 2009, Derwent-2009-G53631.*
Notification of Reason(s) for Refusal dated Jul. 16, 2013, with English translation.

* cited by examiner

*Primary Examiner* — Timothy Thompson
*Assistant Examiner* — Charles Pizzuto
(74) *Attorney, Agent, or Firm* — McGinn Intellectual Property Law Group, PLLC

(57)   ABSTRACT

An oil-cooled equipment harness includes a shielded wire including a conductor, a shielding layer on a periphery of the conductor, and a flexibility, a terminal fitting enclosing a front end part of the shielded wire, a housing enclosing a periphery of the shielded wire a predetermined distance away from the terminal fitting such that shielded wire is exposed from the terminal fitting, the housing including a flange, a first oil entry-preventing means disposed at a space between the shielded wire and the terminal fitting for preventing oil in the shielding case from entering into the conductor, and an oil leak-preventing means disposed at a space between the housing and the shielding case for preventing the oil in the shielding case from leaking out of the shielding case. The terminal fitting and the housing are relatively movable by the shielded wire exposed at between the terminal fitting and the housing.

20 Claims, 1 Drawing Sheet

OIL-COOLED EQUIPMENT HARNESS

The present application is based on Japanese patent application No. 2010-170863 filed on Jul. 29, 2010, the entire contents of which are incorporated herein by reference.

BACKGROUND OF THE INVENTION

1. Field of the Invention

This invention relates to an oil-cooled equipment harness.

2. Description of the Related Art

An oil cooling system in which an equipment is cooled by an insulating oil has been used for cooling the interior of equipments which generating heat at high temperature. For example, equipment (herein called "oil-cooled equipment") with the oil-cooling system includes an oil-cooled motor that an oil-cooled motor body is enclosed in a shielded case and oil is filled in the shielded case. Recently, the oil-cooled motor is increasingly developed according as hybrid vehicles and electric vehicles have been popularized.

JP-A-2003-272729 discloses an oil-cooled motor harness with a connector structure for connecting an oil-cooled motor to an inverter.

As shown in FIG. 2, the oil-cooled motor harness 31 in JP-A-2003-272729 is connected to the oil-cooled equipment (i.e., oil-cooled motor) that encloses an oil-cooled motor body 34 in a shielding case 35 of a conductive material. In the shielding case 35, three bus bar-shaped terminals 32 are provided extending from the oil-cooled motor body 34.

The oil-cooled motor harness 31 is comprised of a shielded wire 44, a flange portion 38, a terminal fitting 37, and a casing 39. The shielded wire 44 is constructed such that a conductor of plural metal thin wires is enclosed by a cylindrical insulation 41 of an insulating synthetic resin material, a cylindrical shielding layer 42 of braided wires is disposed on the periphery of the insulation 41, and the shielding layer 42 is enclosed by a sheath 43 of a synthetic resin material. At the front end part of the shielded wire 44, the sheath 43 is removed such that the insulation 41 and the shielding layer 42 are exposed and protruded from the front end of the sheath 43, and the front end part of the insulation 41 is further removed such that the conductor 40 is exposed and protruded from the front end of the insulation 41.

A conductive sleeve 46 is externally fitted to the front end part of the sheath 43, the shielding layer 42 is exposed from the front end of the sheath 43 and externally fitted being folded back at nearly the front half part of the sleeve 46, and a metallic crimping tube 45 is fixed by crimping conductively to the folded shielding layer 42. The crimping tube 45 allows the sleeve 46 and the shielding layer 42 to be restricted in free movement relative to the front end part of the sheath 43.

The flange 38 is fitted conductively to nearly the back half part of the sleeve 46. The flange 38 is formed of a conductive material, and a circular tube 47 with an axis parallel to the shielded wire 44 is integrated with the flat plate-shaped flange 38 orthogonal to the axis direction of the shielded wire 44. The flange 38 is provided with a bolt hole and fixed conductively to the shielding case 35 by the bolt 36.

The terminal fitting 37 is formed schematically elongate in the depth direction by bending a metal plate punched into a predetermined shape. The front half part of the terminal fitting 37 is flat plate-shaped, provided with a bolt hole, and fixed to the terminal 32 of the oil-cooled motor body 34 by a bolt 33. The terminal fitting 37 is connected to the conductor 40 of the shielded wire 44 by crimping.

The casing 39 is integrally formed by resin molding such that the front end part of the shielded wire 44 are on the entire periphery enclosed with no space therebetween.

The front half part of the terminal fitting 37 is provided with a small diameter part 51 where the outer surface is concaved into a groove on the entire periphery. The small diameter part 51 is coated with adhesives so as to prevent oil from reaching the conductor 40 of the shielded wire 44.

A rubber O-ring 50 is externally fitted to the insulation 41, the tube 47 is provided with grooves on the entire periphery, and the grooves are coated with the adhesives 52. Thereby, oil can be prevented from reaching the shielding layer 42 and the crimping tube 45 of the shielded wire 44.

A sealing groove is formed on the periphery of the casing 39, a rubber O-ring 53 is fitted to the sealing groove. Thereby, oil can be prevented from leaking through the space between the shielding case 35 and the casing 39.

SUMMARY OF THE INVENTION

However, the oil-cooled motor harness 31 in JP-A-2003-272729 may cause the following problems.

Where the distance between the contact surface with the terminal 32 of the terminal fitting 37 and the oil-cooled motor body 34 is defined as L4, and the distance between the contact surface with the terminal fitting 37 of the terminal 32 and the oil-cooled motor body 34 is defined as L5, it is difficult for L4 and L5 to have the same dimension. In other words, a space (interference) is produced at between the terminal fitting 37 and the terminal 32. When the bolt 33 is tightened in this state, a load may be applied to the tip portion of the terminal fitting 37, whereby a maximum bending moment acts on the contact part D (contact part F in case of interference, the same shall apply hereinafter) between the casing 39 and the shielding case 35.

As mentioned earlier, the casing 39 is of resin. The resin of the casing 39 may cause peeling or cracking near at the contact part D depending on the size of the space between the terminal fitting 37 and the terminal 32. Thereby, oil inside the equipment may reach the shielding layer 42 and the crimping tube 45 of the shielded wire 44 so as to reduce the shielding performance.

Furthermore, a bending moment may act on the boundary part E between the terminal fitting 37 and the casing 39. In this case, the resin of the casing 39 may cause peeling or cracking near at the boundary part E, and the adhesive may be peeled. This may cause a reduction in the oil-preventing performance for the conductor 40 of the shielded wire 44.

Although a measure may be suggested that enhances the dimension accuracy of L4 and L5 so as to decrease the space between the terminal fitting 37 and the terminal 32 as much as possible, it is not desirable since the manufacturing cost increases due to the enhancement of the dimension accuracy.

It is an object of the invention to provide an oil-cooled equipment harness that can suppress the reduction in the oil-preventing performance without increasing the manufacturing cost.

(1) According to one embodiment of the invention, an oil-cooled equipment harness comprises:

a front end to be enclosed in a shielding case of an oil-cooled equipment for connecting to a terminal of a body of the oil-cooled equipment disposed in the shielding case;

a shielded wire comprising a conductor, a shielding layer on a periphery of the conductor, and a flexibility;

a terminal fitting enclosing a front end part of the shielded wire, connecting to the conductor, and connecting to the terminal of the body of the oil-cooled equipment;

a housing enclosing a periphery of the shielded wire a predetermined distance away from the terminal fitting such that shielded wire is exposed from the terminal fitting, the housing comprising a flange for attaching the housing to the shielding case;

a first oil entry-preventing means disposed at a space between the shielded wire and the terminal fitting for preventing oil in the shielding case from entering into the conductor; and an oil leak-preventing means disposed at a space between the housing and the shielding case for preventing the oil in the shielding case from leaking out of the shielding case, wherein the terminal fitting and the housing are relatively movable by the shielded wire exposed at between the terminal fitting and the housing.

In the above embodiment (1) of the invention, the following modifications and changes can be made.

(i) The shielded wire further comprises an insulating elastic member between the conductor and the shielding layer, the terminal fitting comprises a tubular crimping part on a back end side thereof, and the first oil entry-preventing means comprises the insulating elastic member crimped by the tubular crimping member.

(ii) The shielded wire further comprises an insulating elastic sheath on a periphery of the shielding layer, the terminal fitting comprises a tubular crimping part on a back end side thereof, and the first oil entry-preventing means comprises the insulating elastic sheath crimped by the tubular crimping member.

(iii) The shielding layer is exposed from the shielded wire in the housing, and conductively fixed to the housing.

(iv) The oil-cooled equipment harness further comprises a second oil entry-preventing means at a position nearer to the shielding case than the shielding layer in the housing for preventing the oil in the shielding case from entering into the shielding layer.

Points of the Invention

According to one embodiment of the invention, a oil-cooled equipment harness is constructed such that it is possible to achieve L2=L1 owing to the flexibility of a shielded wire exposed at between a terminal fitting and a housing on a periphery of the shielded wire, where the distance between the contact surface of the terminal fitting of the harness with the terminal of the body of an equipment (connecting to the harness) and the body of the equipment is defined as L1, and the distance between the contact surface of the terminal of the body of the equipment with the terminal fitting of the harness and the body of the equipment is defined as L2. In other words, no space (interference) is produced at between the terminal fitting and the terminal of the body of the equipment. Even when a bolt is tightened in this state, a space between the housing and a shielding case (enclosing the equipment) can be reduced that may be caused by the bending moment acting on the contact part A between the housing and the shielding case. Thus, the reduction in the oil-preventing performance can be suppressed.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

The preferred embodiments of the invention will be described below referring to the appended drawings.

Figure 1:
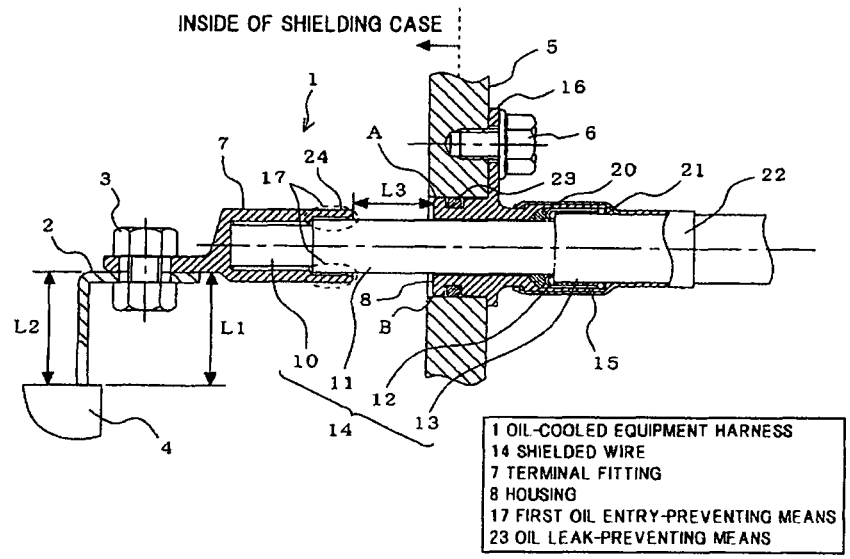
FIG. 1 is a cross sectional view showing an oil-cooled equipment harness in a preferred embodiment according to the invention.
Figure 2:
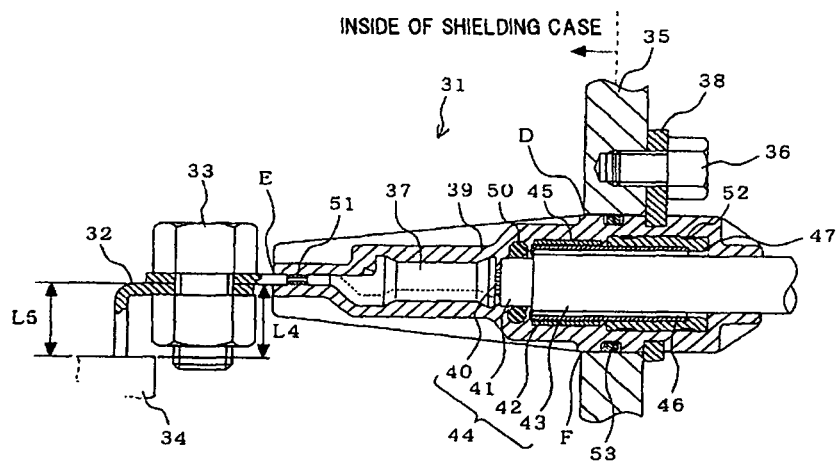
FIG. 2 is a cross sectional view showing the conventional oil-cooled equipment harness.

FIG. 1 is a cross sectional view showing an oil-cooled equipment harness 1 in a preferred embodiment according to the invention.

As shown in FIG. 1, the oil-cooled equipment harness 1 of the embodiment is constructed such that its front end side is enclosed in a shielding case 5 of an oil-cooled equipment and connected to a terminal 2 of the body of the equipment disposed in the shielding case 5. The oil-cooled equipment harness 1 comprises a flexible shielded wire 14 composed at least of a conductor 10 and a shielding layer 12 on the periphery of the conductor 10, a terminal fitting 7 that encloses the front end side of the shielded wire 14, is connected to the conductor 10, and connected to the terminal 2 of the body of the equipment, a housing 8 that is provided with a flange 16 to be thereby attached to the shielding case 5, and encloses the periphery of the shielded wire 14 a predetermined distance away from the shielding case 5 so as to expose the shielded wire 14 from the terminal fitting 7, a first oil entry-preventing means 17 disposed at the space between the shielded wire 14 and the terminal fitting 7 for preventing the oil in the shielding case 5 from inflowing into the conductor 10, an oil leak-preventing means 23 disposed at the space between the housing 8 and the shielding case 5 for preventing the oil in the shielding case 5 from leaking out of the shielding case 5. The terminal fitting 7 and the housing 8 are installed such that they are relatively movable through the shielded wire 14 exposed at between the terminal fitting 7 and the housing 8.

The details of the oil-cooled equipment harness 1 will be described below.

As shown in FIG. 1, the oil-cooled equipment harness 1 of the embodiment is connected to the oil-cooled equipment (i.e., an oil-cooled motor) that the body 4 is enclosed in the shielding case 5 of a conductive material and the oil for oil-cooling is filled in the shielding case 5. In the shielding case 5, three bus bar-shaped terminals 2 are provided extending from the body 4 such as an oil-cooled motor body. In other words, the oil-cooled equipment harness 1 is installed such that the front end side thereof is enclosed in the shielding case 5 of the equipment and connected to the terminal 2 of the body 4 in the shielding case 5.

In this embodiment, the shielded wire 14 is constructed such that the conductor 10 composed of plural thin wires is enclosed by the tubular insulation 11, the tubular shielding layer 12 of braided wires is disposed on the periphery of the insulation 11, and the sheath 13 encloses the shielding layer 12. At the front end part of the shielded wire 14, the sheath 13 is removed such that the insulation 11 and the shielding layer 12 are exposed and protruded from the front end of the sheath 13, and the front end part of the insulation 11 is further removed such that the conductor 10 is exposed and protruded from the front end of the insulation 11.

A conductive sleeve 15 is externally fitted to the front end part of the sheath 13, the shielding layer 12 exposed is externally fitted being folded back to the sleeve 15, and the folded shielding layer 12 is conductively fitted by crimping to nearly the back half part of the metallic housing 8. The flange 16 is integrated with the metallic housing 8. The flange 16 is provided with a bolt hole and fixed conductively to the shielding case 5 by a bolt 6.

The front half part of the terminal fitting 7 is flat plate-shaped, provided with a bolt hole, and fixed to the terminal 2 of the oil-cooled motor body 4 by a bolt 3. The back half part of the terminal fitting 7 is formed tubular such that the conductor 10 and the insulation 11 of the shielded wire 14 are inserted into the tubular part of the terminal fitting 7 and connected thereto by being crimped at a tubular crimping part 24 on the back end side of the terminal fitting 7.

The insulation 11 is formed of an insulating elastic member such that the space between the terminal fitting 7 and the insulation 11 can be sealed by the repulsive force of the elastic member produced when insulation 11 is crimped at the tubular crimping part 24 so as to prevent the oil from entering into the conductor 10 (the first oil entry-preventing means 17). The first oil entry-preventing means 17 may be a rubber O-ring disposed at between the insulation 11 and the terminal fitting 7. In this case, the inner surface of the terminal fitting 7 is preferably provided with a groove to be engaged with the rubber O-ring. This can prevent the oil from entering into the conductor 10, e.g., even when the insulation 11 produces no desired repulsive force.

As described earlier, in this embodiment, the terminal fitting 7 and the housing 8 are installed such that they are relatively movable through the shielded wire 14 exposed at between the terminal fitting 7 and the housing 8. Therefore, the difference between the distance an exit (not shown) where the shielded wire 14 exits from the housing 8 and L2 (i.e., the distance between the contact surface of the terminal 2 of the body 4 of the equipment with the terminal fitting 7 and the body 4 of the equipment) is large, the space may occur at the exit and between the housing 8 and the insulation 11 of the shielded wire 14 such that the oil is likely to enter into the shielding layer 12 through the space.

In the embodiment, a rubber O-ring 20 as a second oil entry-preventing means is provided at the position nearer to the shielding case 5 than the shielding layer 12 in the housing 8 for preventing the oil in the shielding case 5 from entering into the shielding layer 12.

The rubber O-ring 20 is externally fitted to the insulation 11 so as to seal the space between the housing 8 and the insulation 11 of the shielded wire 14.

A sealing groove is formed on the periphery of the housing 8, and a rubber O-ring 23 is fitted to the sealing groove. Thereby, oil can be prevented from leaking through the space between the shielding case 5 and the housing 8 (oil leak-preventing means).

Furthermore, adhesives 21 are coated on nearly the back half part of the housing 8, and the adhesives 21 are covered with a heat shrinkable tube 22, so as to prevent water outside of the equipment from reaching into the shielding layer 12 of the shielded wire 14 and the sleeve 15.

The effects and functions of the oil-cooled equipment harness 1 of the embodiment will be described below.

The housing 8 is provided a predetermined distance L3 away from the end of the terminal fitting 7 on the periphery of the shielded wire 14 such that the shielded wire 14 is exposed from the terminal fitting 7. Thereby, in the oil-cooled equipment harness 1, the terminal fitting 7 and the housing 8 are installed such that they are relatively (i.e., mutually) movable through the shielded wire 14 exposed at between the terminal fitting 7 and the housing 8.

Where the distance between the contact surface of the terminal fitting 7 with the terminal 2 of the body 4 of the equipment and the body 4 of the equipment is defined as L1, and the distance between the contact surface of the terminal 2 of the body 4 of the equipment with the terminal fitting 7 and the body 4 of the equipment is defined as L2, it is possible to achieve L2=L1 owing to the flexibility of the shielded wire 14 between the terminal fitting 7 and the housing 8. In other words, no space (interference) is produced at between the terminal fitting 7 and the terminal 2 of the body of the equipment. Even when the bolt 3 is tightened in this state, a space between the housing 8 and the shielding case 5 can be reduced that may be caused by a bending moment acting on the contact part A (contact part B in case of interference, the same shall apply hereinafter) between the housing 8 and the shielding case 5. Thus, the reduction in the oil-preventing performance can be suppressed.

Therefore, the dimension accuracy of L1 and L2 need not be enhanced. As a result, the reduction in the oil-preventing performance can be suppressed without increasing the manufacturing cost due to the enhancement of the dimension accuracy.

In the embodiment, the first oil entry-preventing means 17 is constructed such that the sheath 13 is removed at the front end part of the shielded wire 14 so as to allow the insulation 11 and the shielding layer 12 to be exposed and protrude from the front end of the sheath 13, the front end part of the insulation 11 is removed so as to allow the conductor 10 to be exposed and protrude from the front end of the insulation 11, and the insulation 11 is crimped at the tubular crimping part 24 formed on the back end side of the terminal fitting 7. However, the invention is not limited to this construction. For example, the sheath 13, the shielding layer 12 and the insulation 11 may not be removed such that the conductor 10, the insulation 11 and the shielding layer 12 are not exposed. In this case, the first oil entry-preventing means 17 may be modified such that the sheath 13 formed of an insulating elastic member is crimped by the tubular crimping part 24 formed on the back end side of the terminal fitting 7. In this modification, the second oil entry-preventing means can be omitted.

As in the embodiment, the harness connected to the motor is generally three-phase line for U, V and W phases. In this case, the predetermined distance L3 between the terminal fitting 7 and the housing 8 can be set to be, e.g., L3=20, 30, 40 [mm] so as to prevent the erroneous assembly of the three-phase line. Although the oil-cooled equipment harness 1 of the embodiment is connected to the three-phase motor, the invention is not limited to this connection and may apply to all uses for preventing the erroneous assembly of the oil-cooled equipment harness 1 with plural lines.

The oil-cooled equipment harness 1 according to the invention is not limited to only use for the oil-cooled motor, and may be used for connecting to the terminal of a body disposed in an oil-cooled equipment, such as an oil-cooled engine, with oil filled therein.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. An oil-cooled equipment harness, comprising:
   a front end to be enclosed in a shielding case of an oil-cooled equipment for connecting to a terminal of a body of the oil-cooled equipment disposed in the shielding case;
   a shielded wire comprising a conductor, a shielding layer on a periphery of the conductor, an insulating elastic member between the conductor and the shielding layer, and a flexibility;

a terminal fitting enclosing a portion of the conductor and a portion of the insulating elastic member of the shielded wire, connecting to the conductor, and connecting to the terminal of the body of the oil-cooled equipment;

a housing enclosing a periphery of the shielded wire a predetermined distance away from the terminal fitting such that shielded wire is exposed from the terminal fitting, the housing comprising a flange for attaching the housing to the shielding case;

first oil entry-preventing means disposed at a space between the shielded wire and the terminal fitting for preventing oil in the shielding case from entering into the conductor; and oil leak-preventing means disposed at a space between the housing and the shielding case for preventing the oil in the shielding case from leaking out of the shielding case, wherein the terminal fitting comprises a tubular part for covering the portion of the conductor and the portion of the insulating elastic member from being exposed to the shield case, wherein the first oil entry-preventing means comprises the portion of the insulating elastic member crimped by a tubular crimping member formed at the tubular part, and wherein the terminal fitting and the housing are relatively movable by the shielded wire exposed at between the terminal fitting and the housing.

2. The oil-cooled equipment harness according to claim 1, wherein the terminal fitting comprises the tubular crimping part on a back end side thereof.

3. The oil-cooled equipment harness according to claim 1, wherein the insulating elastic member comprises an insulating elastic sheath on a periphery of the shielding layer, the terminal fitting comprises the tubular crimping part on a back end side thereof.

4. The oil-cooled equipment harness according to claim 1, wherein the shielding layer is exposed from the shielded wire in the housing, and conductively fixed to the housing.

5. The oil-cooled equipment harness according to claim 4, further comprising second oil entry-preventing means at a position closer to the shielding case than the shielding layer in the housing for preventing the oil in the shielding case from entering into the shielding layer.

6. The oil-cooled equipment harness according to claim 1, wherein the portion of the conductor comprises a front end part of the shielded wire located between the terminal and the housing.

7. The oil-cooled equipment harness according to claim 1, wherein the insulating elastic member comprises an insulating elastic sheath on a periphery of the shielding layer.

8. The oil-cooled equipment harness according to claim 7, wherein the shielding layer is exposed from the shielded wire in the housing.

9. The oil-cooled equipment harness according to claim 2, further comprising:

second oil entry-preventing means located at a position closer to the shielding case than the shielding layer in the housing.

10. The oil-cooled equipment harness according to claim 1, further comprising:

second oil entry-preventing means located at a position closer to the shielding case than the shielding layer in the housing for preventing the oil in the shielding case from entering into the shielding layer.

11. The oil-cooled equipment harness according to claim 1, wherein the shielding layer comprises braided wires disposed on a periphery of the insulating elastic member.

12. The oil-cooled equipment harness according to claim 1, further comprising:

a sheath enclosing the shielding layer.

13. The oil-cooled equipment harness according to claim 12, wherein, at a front end part of the shielded wire, the sheath is removed such that the insulating elastic member and the shielding layer are exposed and protruded from a front end of the sheath.

14. The oil-cooled equipment harness according to claim 13, wherein a front end part of the insulating elastic member is removed such that the conductor is exposed and protruded from the front end part of the insulating elastic member.

15. The oil-cooled equipment harness according to claim 14, further comprising:

a conductive sleeve externally fitted to the front end of the sheath, the shielding layer is externally fitted to the sleeve, and the folded shielding layer is conductively fitted by crimping to a back part of the housing.

16. The oil-cooled equipment harness according to claim 1, wherein a front half part of the terminal fitting includes a flat plate, is provided with a bolt hole, and is fixed to the terminal by a bolt.

17. The oil-cooled equipment harness according to claim 16, wherein a back half part of the terminal fitting is formed tubular such that the conductor and the insulating elastic member are inserted into the tubular part of the terminal fitting and connected thereto by being crimped by the tubular crimping member on a back end side of the terminal fitting.

18. The oil-cooled equipment harness according to claim 1, wherein a space between the terminal fitting and the insulating elastic member is sealed by a repulsive force of the insulating elastic member produced when the insulating elastic member is crimped at the tubular crimping member to prevent the oil from entering into the conductor.

19. The oil-cooled equipment harness according to claim 1, wherein the first oil entry-preventing means comprises an O-ring disposed between the insulating elastic member and the terminal fitting.

20. The oil-cooled equipment harness according to claim 19, wherein an inner surface of the terminal fitting is provided with a groove to be engaged with the O-ring.

\* \* \* \* \*